United States Patent [19]

Lawhon et al.

[11] Patent Number: 4,659,356
[45] Date of Patent: Apr. 21, 1987

[54] KILN CONSTRUCTION

[75] Inventors: Robert A. Lawhon, Decatur; James L. Karraker, Mt. Zion, both of Ill.

[73] Assignee: PPG Industries, Inc., Pittsburgh, Pa.

[21] Appl. No.: 797,085

[22] Filed: Nov. 12, 1985

[51] Int. Cl.[4] ............................................. C03B 3/00
[52] U.S. Cl. ......................................... 65/27; 65/335; 432/110; 432/111
[58] Field of Search ..................... 65/27, 335, 134; 432/110, 111

[56] References Cited

U.S. PATENT DOCUMENTS

| | | | |
|---|---|---|---|
| 2,176,267 | 10/1939 | Meiselman et al. | 266/205 |
| 2,857,684 | 10/1958 | Halldorsson | 34/66 |
| 3,682,666 | 8/1972 | Lacourrege | 65/27 X |
| 4,381,934 | 5/1983 | Kunkle et al. | 65/135 |
| 4,427,376 | 1/1984 | Etnyre et al. | 432/105 |
| 4,519,814 | 5/1985 | Demarest, Jr. | 65/27 |

Primary Examiner—Arthur Kellogg
Attorney, Agent, or Firm—Andrew C. Siminerio

[57] ABSTRACT

An apparatus for and method of adjusting the effective length of a rotary kiln. Preheating gas enters the kiln, passes over a portion of the material to be heated and exits the kiln through an axially extending exhaust duct. Changing the length of the duct modifies the amount of time the material is subjected to direct heating by the gas so that the effective heating length of the kiln is changed.

12 Claims, 3 Drawing Figures

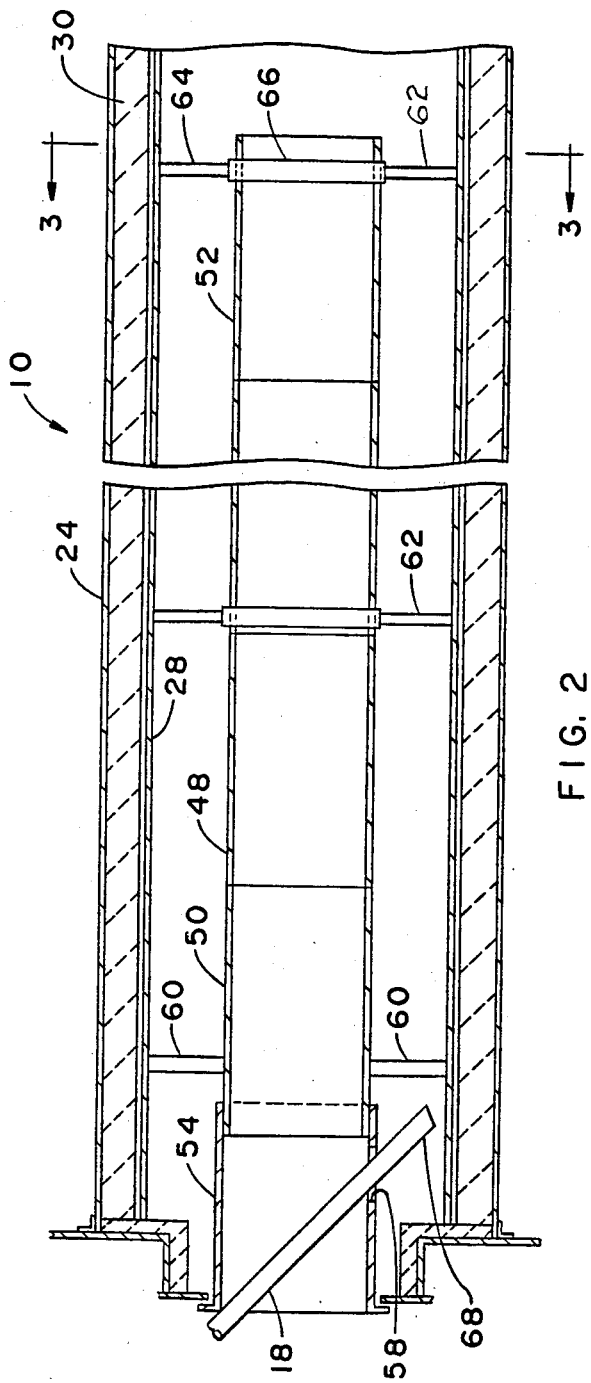
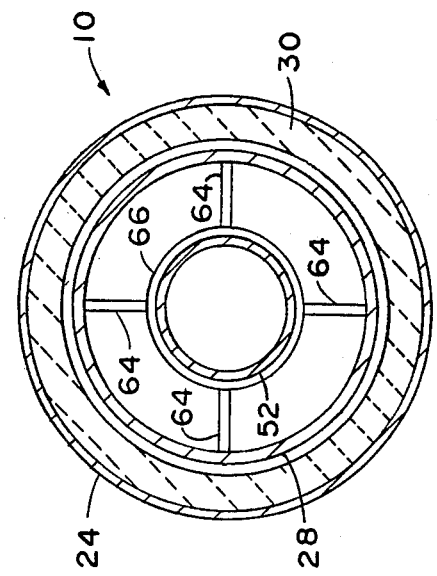
FIG. 2
FIG. 3

KILN CONSTRUCTION

BACKGROUND OF THE INVENTION

1. Field of the Invention

This invention relates to heating vessels and, in particular, to an apparatus for and method of adjusting the effective length of a rotary kiln as it is used to preheat batch material in a glass melting operation, but is applicable to other processes that require the heating of generally flowable materials.

2a. Technical Considerations

It has long been recognized that exhaust gas from combustion processes contains thermal energy that can be recovered to improve the overall efficiency of the process. In particular, glass melting furnace or other melting process furnaces contain large amounts of recoverable thermal energy. Conventionally, regenerators and recuperators have been employed to recover heat from melting process furnaces by preheating combustion air to be used during the melting process, but their efficiency is less than desired. Instead of preheating combustion air by way of regenerators or recuperators, it has been proposed to recover waste heat by means of preheating the feed material.

A rotary kiln can be used as a first stage preheating vessel in a multi-stage melting process. Exhaust gas from a second stage melting furnace is directed through the kiln to heat the material. The length of the kiln is chosen in accordance with the amount of heat to be transferred from the hot exhaust gases to the feed material. With all other factors remaining constant, the longer the kiln, the more time the feed material is exposed to the hot exhaust gases. When feed material must be exposed to the exhaust gas for a longer time than possible with a given kiln configuration due to the nature of the batch components or variations in the melting process in the second stage furnace, the kiln must be modified to add additional sections to increase its length in order to increase the overall residence time of the feed material in the kiln.

Dusting of dry pulverulent batch material is a problem when feeding the batch materials to a conventional melting furnace. A common solution to this problem is to wet the batch (e.g. with water), but preheating the batch to any significant extent precludes maintaining the batch in a wetted condition. Furthermore, air turbulence created by preheating gases exiting the rotary kiln at high velocities tend to contribute to the entrainment of the dry batch materials in the gases as it is loaded into the kiln. The dusted exhaust gas must then be filtered to remove the air particulates for pollution purposes.

In U.S. Pat. No. 4,381,934 to Kunkle and Matesa, there is disclosed an intensified batch liquefying process in which large volumes of batch are efficiently liquefied in a relatively small space. This type of process, particularly when using intensified heat sources, produces relatively small volumes of high temperature exhaust gas that can be used to preheat batch material in a rotary kiln and thus further improve the overall efficiency of the process. In a process such as disclosed in U.S. Pat. No. 4,381,934, the firing rate, i.e. the amount of heat used in the second stage varies, depending on the specific operating conditions and parameters. The varying firing rate inherently varies the exhaust gas temperature and flow which in turn affects the preheating conditions within the rotary kiln. It would be desirable to develop a way to modify the effective length of a heating vessel, so as to provide the proper heating length that corresponds to the varying heat content of exhaust from a 2nd stage heating process. In addition, it is desirable to use the hot exhaust gas while limiting the amount of dust entrainment within the vessel.

2b. Patents of Interest

U.S. Pat. No. 2,176,267 to Meiselman et al. teaches a sweating type furnace with two coaxial drums. Material is charged into the inner drum and as the furnace rotates, the charge progresses towards the lower end. A burner at the discharge end melts specific metals in the charge which, in turn, drop through slots in the inner drum to the outer drum for subsequent collection.

U.S. Pat. No. 2,857,684 to Haldorsson teaches a rotary cooler and dryer with a slidable exhaust duct. The bell-shaped mouth of the sliding duct is positioned within the rotary dryer drum at the area of deepest suction within the dryer so that dust particles of a certain size can be separated from the rest of the material and be discharged from the cyclone.

U.S. Pat. No. 4,427,376 to Etnyre et al. teaches a rotary dryer for aggregate material wherein a burner at the discharge end directs a flame through an elongated firing tube toward the dryer loading end. The hot gas strikes a baffle plate and is deflected forward through a chamber between the firing tube and an outer drum towards the discharge end. As a result, the material within the drum is heated indirectly by the gas passing through the firing tube and directly by the reflected gas flowing back to the discharge end.

U.S. Pat. No. 4,519,814 to Demarest, Jr. teaches as a two stage liquefaction process wherein batch material in the first stage is heated to an intermediate temperature by exhaust gas from the second stage heater. In order to reduce dust entrainment caused by the exhaust gas blowing over and through the batch material, the temperature of the exhaust gas is reduced below the dew point of water by sufficient countercurrent contact between the gas and the material. This wetted condition reduces particulates in the exhaust stream.

SUMMARY OF THE INVENTION

An object of the present invention is to provide a kiln for heating pulverulent material that includes an elongated drum with a material inlet end and a material outlet end wherein material is deposited on the inner surface of the drum at a material loading location adjacent to the inlet end. Gas is directed to move through the drum towards and out from the inlet end of the kiln while the material is simultaneously shielded at the loading location from the gas so as to reduce entrainment of the material in the gas. The effective heating length of the kiln can be changed by positioning an elongated exhaust duct generally centrally within the drum, extending from the inlet end towards the outlet end to form an elongated annular chamber between an inner wall of the drum and outer wall of the duct. The gas enters the kiln, passing over and heating a portion of the material in the kiln, and exits the kiln through the exhaust duct. The exhaust duct further includes a stationary sleeve at the inlet end of the drum and a longitudinally extending hollow member having an end portion rotatably connected to the sleeve. The hollow member is mounted for rotation relative to the sleeve. A delivery tube extends into the sleeve through an opening in the wall of the sleeve, with one end of the tube terminating in close proximity to the inner surface of the drum in the annular chamber. The length of the hollow member can be varied.

Another object of this invention is to provide a method of heating material as it advances through a heating vessel. Material to be heated is deposited within the heating vessel at a loading end. As the material advances through the vessel towards an unloading end, a portion of the material is directly exposed to hot gas that passes through the heating vessel. The gas exits the vessel through an adjustable exhaust duct that varies the portion of material in the vessel that is directly exposed to the gas. The gas is exhausted from the loading end of the vessel. The material is shielded from the exhausting hot gas at the location it is deposited in the vessel by physically maintaining the gas and the material separate from one another at said loading end as said gas moves through said vessel.

BRIEF DESCRIPTION OF THE DRAWINGS

FIG. 2 is an enlarged section of the loading end of the rotary kiln showing a preferred embodiment of the invention.

FIG. 3 is a cross-sectional view of the kiln taken through line 3—3 of FIG. 2.

DETAILED DESCRIPTION OF THE INVENTION

Figure 1:
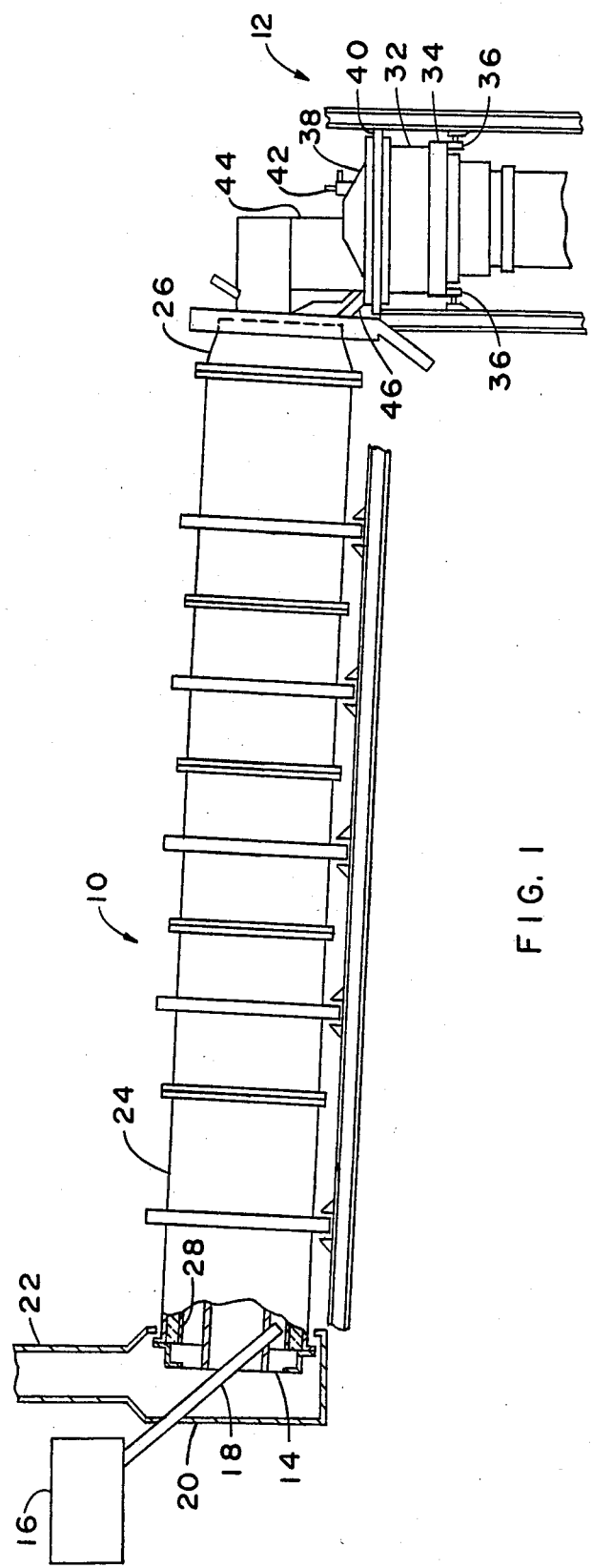
FIG. 1 is an elevation view of a two-stage batch liquefaction arrangement with a rotary kiln incorporating features of a preferred embodiment of the present invention.

The invention as disclosed hereafter is used to heat pulverulent material as it passes through a heating vessel. Although not limited to any particular application, the invention is particularly useful in preheating batch material in a two-stage bath liquefaction process as disclosed in commonly assigned U.S. Pat. No. 4,519,814, which teachings are hereby incorporated by reference. The following disclose the present invention as it is used in such a two stage liquefaction process but it is understood that this in no way is meant to limit the application of the present invention which can also be used in both single stage and multi-stage heating operations.

In a two-stage batch liquefaction process, batch is transported relatively slowly in a first zone as it heated to a temperature approaching incipient liquefaction. The batch is then transferred to a second zone where the preheated batch is deposited onto a sloped surface and rapidly liquefied by intense heating. The liquefied batch flows out of the second zone into a collecting vessel. This two-stage process separates the batch liquefaction operation into a preliquefaction stage and a liquefaction stage and provides each stage with conditions that maximize the efficiency of each stage. In the first zone where the preliquefaction stage occurs, there are no essential time restraints in transferring heat to the batch other than the amount of heat to be transferred to the batch. Therefore, the vessel in the first zone may be relatively extensive in size, may utilize relatively low temperature heat and preferably provides agitation to the batch in order to heat the batch throughout. The second zone where the liquefaction stage occurs is adapted to apply intense heat to the batch to convert the batch to a liquefied state. The first zone preferably employs waste heat from the second zone. Batch material is conveyed through the first zone, preferably at a slow rate, so as to maximize transfer of heat from the exhaust gas to the material. The relatively slow material transport in the first zone can be maintained only so long as the material remains free flowing. If the material temperature approaches the melting point of one of its constituents, for example, through creation of a liquid phase, there may be cohesion between batch material which, in turn, may result in detrimental agglomerating of the batch material which can cause adherence to the preliquefaction vessel or plugging of the first zone. Therefore, the amount of heat absorbed by the batch material during preheating, must be limited. As the batch approaches this condition, the batch material is transferred to the second zone and brought to a liquefied state.

Preheating batch materials in accordance with the present invention is particularly advantageous in combination with the ablation enhancing batch liquefying arrangements as described in U.S. Pat. No. 4,381,934, which teachings are hereby incorporated by reference. Preheating batch reduces the heat requirement for liquefying the batch material which theoretically should yield a greater throughput in the melter. The use of hot exhaust gas from the melter increases the overall system efficiency. The batch liquefaction arrangements of U.S. Pat. No. 4,381,934 which are adapted to enhance the runoff of liquefied batch by providing a sloped melting surface and rapid draining of the liquefied material, are particularly well suited to take advantage of the higher throughputs that can be achieved by batch preheating. The second zone embodiments such as those taught in U.S. Pat. No. 4,381,934 wherein a layer of batch encircles the heat source, are well suited for use with high temperatures produced by oxygen-fired combustion. Oxygen firing in such an arrangement produces a relatively small volume, high temperature exhaust gas compared to conventional glass melting furnaces and this small volume, higher temperature exhaust gas stream is particularly well suited for heat recovery and preheating of the batch material. Other high temperature heat sources that substantially reduce the volume of $NO_x$ pollutants from the exhaust stream also lend themselves to the invention.

FIG. 1 shows a rotary kiln 10 as it feeds batch material to a liquefaction vessel 12. Batch material is fed into the inlet or "cold" end 14 of the kiln from a continuous weighing and metering device 16 through delivery tube 18.

The open end of the rotary kiln 10 at the cold end 14 is enclosed by an exhaust box 20 which directs exhaust gases leaving the rotary kiln 10 to a duct 22. The duct 22 may lead to a fan (not shown) which provides the draft for drawing the exhaust gases through the rotary kiln 10 and for discharging the exhaust gas to the atmosphere through a stack (not shown). It is understood that this exhausting arrangement is illustrative and there are other arrangements well known in the art for drawing the exhaust gas through the kiln 10.

The rotary kiln is generally of a conventional design consisting basically of cylindrical steel shell 24 mounted for rotation about the cylindrical axis which is inclined slightly downward from horizontal so as to convey the batch material from the cold end 14 towards its outlet or hot end 26 by gravity and tumbling. Referring now to FIGS. 2 and 3, the interior wall 28 of the rotary kiln 10 is generally stainless steel plate and may include lifters or baffles (not shown) to help mix and agitate the batch material as it moves through the length of the kiln 10.

The shell 24 and the interior wall 28 are generally separated by a refractory liner 30.

Referring to FIG. 1, the liquefaction vessel 12 is of the type similar to that disclosed in U.S. Pat. No. 4,381,934 and is comprised of a steel drum 32, supported on a circular frame 34 which is, in turn, mounted for rotation about a generally vertical axis corresponding to the center line of the drum on a plurality of supporting and aligning rollers 36. An opening (not shown) at the base of the drum 32 provides the outlet opening from the liquefaction vessel 12. An upwardly domed refractory lid 38 is provided with stationary support by means of circular frame member 40. The lid 38 includes at least one burner 42 to provide a heat source within the liquefaction vessel 12.

Exhaust gases escape upwardly through an opening (not shown) in the lid 38 and into exhaust duct 44. The exhaust duct 44 directs the escaped gas from the lid 38 to the hot end 26 of the rotary kiln 10 where it is used to preheat the batch material. The material is fed into the liquefaction vessel from the hot end 26 of the rotary kiln 10 through the lid opening (not shown) and a feed chute 46 is provided for this purpose.

As shown generally in FIG. 1 and in detail on FIGS. 2 and 3, the inlet end 14 of the kiln 10 includes an adjustable gas exhausting arrangement 48 which is the subject of the present invention. An exhaust duct 50 made up of a single pipe-like member or a plurality of individual duct portions 52 slidably fits into sleeve 54 and extends forward through a portion of the kiln 10 towards the hot end 26 forming an annular chamber 56 between the duct 50 and the inner wall 28 of the kiln 10. In the preferred embodiment, the sleeve 54 is mounted independently of the rotary kiln 10 and does not turn as the kiln 10 rotates. Opening 58 in the sleeve 54 allows the delivery tube 18 to pass therethrough and deposit the pulverulent batch material in the rotary kiln 10 directly at the inner wall 28 within the annular chamber 56. As an alternative, the duct 50 can extend all the way to the inlet end 14 of the kiln 10, eliminating the sleeve 54. The duct 50 would have to include a circumferential opening (not shown) near the inlet end 14 to allow the delivery tube 18 to deposit batch material within the annular chamber 56. The duct 50 is fixably connected to the inner wall 28 of the kiln 10 for rotation therewith by connecting struts 60, which are rigidly attached to the duct 50 and wall 28 in any convenient fashion, such as welding. Spider assemblies 62, which include a plurality of strut members 64 and a collar member 66, slidably receive the duct 50 and support it within the rotary kiln 10. Struts 60 and spider assemblies 62 can be positioned anywhere along duct 50 so long as the duct 50 is provided with adequate support within the kiln 10. Furthermore struts 60 can be replaced by an additional spider assemblies 62 welded to the duct 50 at the collar member 66 to provide a rigged connection between the duct 50 and the kiln inner wall 28. The length of the duct 50 is changed by adding or removing duct portions 52 and adjusting assemblies 62 as required.

The adjustable gas exhausting arrangement 48 as taught in the present invention lessens the problem of dust entrainment of the batch material by the exhaust gas as the gas blows through the deposited material at the exit end of the kiln 10. The hot exhaust gas enters the duct 50 upstream from the point at which the delivery tube 18 feeds the kiln 10, and the exhaust gas is contained within the duct 50 throughout the remaining portion of the kiln 10. The delivery tube 18 encloses the batch material as it passes through the exhaust stream in the sleeve 54, and deposits it in the annular chamber 56. As a result, the exhaust gas does not pass over or through batch material at the discharge end 68 of the delivery tube 18. Furthermore, the arrangement 48 reduces air turbulence within the annular chamber 56 at the inlet end 14 of the kiln 10 by limiting the exhaust gas circulation within the chamber 56 so that less feed material becomes entrained in the exhaust gas.

The present invention also allows the effective heating length of the kiln 10 to be modified to accommodate charges in the firing rate of the furnace 12 and the total throughput of the system without changing the actual kiln length. Firing rate depends on the conditions in the furnace 12 such as type of batch material, initial temperature, type of burner used, etc. These factors lead to variations in the amount and temperature available to preheat batch material in the kiln 10. Furthermore, if throughput is changed, the residence time of the batch material within the kiln 10 is changed thus affecting the amount of heat it absorbs during preheating. In addition, different batch mixture may allow for or require different preheating conditions. Rather than changing actual kiln length by adding or removing sections of the kiln, the adjustable gas exhausting arrangement 48 of the present invention provides a means to vary the effective heating length by changing the duct length of the kiln 10 without affecting any other portion of the process so that the entire preheating/heating system can be adjusted and fine tuned for different operating conditions and materials. Exhaust gas enters the kiln 10 from the outlet end 26, directly exposing a portion of the batch material to the gas. The gas then exits the kiln 10 through the exhaust duct 50. By changing the length of duct 50 within the kiln 10, the amount of time that the batch is subjected to direct preheating by the hot exhaust gas can be changed. For example, if the duration of heating time for a batch mixture must be increased due to increased throughput or lower temperature exhaust gas, duct portions 68 of the duct 50 can be removed so that the exhaust gas exits the kiln 10 closer to the inlet end 14, thus increasing the amount of time that the gas is directly heating the batch material. If the length of heating time must be reduced, additional duct portions 52 can be added to the duct 50.

It should be noted that the length of the duct 50 can be modified in a variety of ways. Rather than directly adding or removing duct portions 52, the duct 50 can be cut or extended to the directed length. As another alternative, the duct 50 can be constructed with telescoping portions that would retract along a common longitudinal axis. Another method would be to lengthen the sleeve 54 and allow duct 50 to slide into and out from the sleeve 54. If required, these methods of modifying the effective preheating length of the kiln 10 could be connected to an automatic sliding arrangement as is well known in the art so that the effective preheating length can be changed without interrupting the operation of the kiln 10.

It should be further noted that, if required by a particular process or result, the adjustable gas exhausting arrangement 48 can be modified such that the duct 50 extends axially through kiln 10 from the outlet end 26 towards the inlet end 14 and this modification would also change the effective length of the rotary kiln 10.

The forms of the invention shown and described herein represent illustrative embodiments and it is understood that various changes can be made without departing from the scope of the invention.

We claim:

1. A kiln for heating pulverulent material comprising:
   an elongated drum with an inner surface, a material inlet end and a material outlet end;
   an elongated exhaust duct having an outer wall;
   means for mounting said duct in said drum to extend generally axially within a portion of said drum from said inlet end towards said outlet end and terminating short of said of said outlet end to provide an elongated annular chamber between the inner wall of said drum and the outer wall of said duct;
   means to deposit said material in said chamber on the inner surface of said drum at a location adjacent said inlet end; and
   means to seal said annular chamber at said material inlet end of said elongated drum to provide a hot gas movement path having its course through said outlet and of said drum towards said inlet end, through said duct, and out of said kiln through said duct, said sealing means preventing hot gas from exiting said drum through said annular chamber so as to reduce circulation of said gas within said elongated annular chamber and entrainment of said material in said gas.

2. The kiln as in claim 1 wherein said exhaust duct further includes a stationary sleeve at said inlet end of said drum and a longitudinally extending hollow member having an end portion rotatably connected to said sleeve and said hollow member being mounted for rotation relative to said sleeve.

3. The kiln as in claim 2 wherein said depositing means includes a delivery tube extending into said sleeve through an opening in the wall of said sleeve, with one end of said tube terminating in close proximity to said inner surface of said drum.

4. The kiln as in claim 3 wherein said hollow member includes means for varying the length of said hollow member.

5. The kiln as in claim 4 wherein said kiln is a first stage of a two-stage heating process and further wherein said gas to be moved through said drum is exhaust gas from the second stage of said two-stage heating process.

6. The kiln as in claim 5 wherein said material is glass batch material.

7. A method of heating material as it advances through a heating vessel comprising:
   providing an exhaust duct within and spaced from a portion of an elongated drum, said duct extending from a material loading end of said vessel towards a material outlet end of said vessel, said duct terminating short of said material outlet end, wherein said drum and duct form an elongated annular chamber;
   sealing the portion of said loading end of said vessel radially outwardly of said duct;
   depositing material to be heated within said annular chamber of said heating vessel at said loading end;
   advancing said material through said vessel towards said material outlet end;
   circulating hot gas in said heating vessel towards said loading end; and
   exhausting said gas from said loading end of said vessel through said duct, wherein said sealed portion of said loading end prevents hot gas from exiting said vessel through said annular chamber so that said hot gas enters said exhaust duct and exits said vessel through said duct, said material within said annular chamber being shielded from direct exposure to said hot gas and remaining material within said vessel being heated by direct exposure to said hot gas.

8. A method as in claim 7 wherein said material is glass batch material.

9. The method as in claim 8 wherein the material exiting said vessel is subsequently heated and said heating generates hot gas and further including the step of moving said hot gas from the subsequent material heating, through said vessel.

10. The method as in claim 9 further including the step of varying the length of said duct so as to vary the portion of material directly exposed to said gas as it enters said vessel at said unloading end and exits said vessel through said exhaust duct.

11. A kiln for heating pulverulent material comprising:
    an elongated drum with a material inlet end and a material outlet end;
    means to deposit said material on the inner surface of said drum at a material loading location adjacent said inlet end; and
    an adjustable length exhaust duct extending generally axially within said drum along a portion of the length of said kiln from said material inlet end toward and terminating short of said material outlet end; and
    means to seal that portion of said inlet end of said drum radially outwardly from said duct wherein hot gas moves through a portion of said drum and exits said drum through said exhaust duct, wherein said hot gas heats a portion of said material within said drum by passing thereover for a predetermined distance prior to exiting said drum through said duct so as to establish an effective heating length of said kiln, and further wherein said adjustable length duct allows said gas to pass over said material for varying distances so as to vary said effective heating length of said kiln.

12. A method of heating pulverulent material as it moves through a kiln comprising:
    depositing said material in said kiln;
    rotating said kiln to advance said material from a material inlet end to a material outlet end of said kiln;
    moving hot gas from said material outlet end through a first portion of said kiln to directly contact and heat a first portion of said material in said first portion of said kiln as said material moves towards said inlet end; and
    shielding a second portion of said material from said gas in a second portion of said kiln adjacent said first portion as said material advances towards said first portion, wherein said gas is isolated from said second portion of said material so as to prevent entrainment of said second portion of said material in said hot gas while said material is shielded within said second portion of said kiln.

* * * * *